United States Patent
Mori et al.

(10) Patent No.: US 12,454,625 B2
(45) Date of Patent: Oct. 28, 2025

(54) AQUEOUS INK

(71) Applicant: KAO CORPORATION, Tokyo (JP)

(72) Inventors: Kazuma Mori, Wakayama (JP); Ryo Nakanishi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 198 days.

(21) Appl. No.: 18/254,074

(22) PCT Filed: Nov. 25, 2021

(86) PCT No.: PCT/JP2021/043086
§ 371 (c)(1),
(2) Date: May 23, 2023

(87) PCT Pub. No.: WO2022/114035
PCT Pub. Date: Jun. 2, 2022

(65) Prior Publication Data
US 2024/0002686 A1  Jan. 4, 2024

(30) Foreign Application Priority Data

Nov. 27, 2020 (JP) ................ 2020-197109

(51) Int. Cl.
| | | |
|---|---|---|
| C09D 11/322 | (2014.01) | |
| B41J 2/01 | (2006.01) | |
| B41J 2/21 | (2006.01) | |
| C09D 11/033 | (2014.01) | |
| C09D 11/037 | (2014.01) | |
| C09D 11/107 | (2014.01) | |

(52) U.S. Cl.
CPC ........... *C09D 11/322* (2013.01); *B41J 2/01* (2013.01); *B41J 2/2107* (2013.01); *C09D 11/033* (2013.01); *C09D 11/037* (2013.01); *C09D 11/107* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 10,100,212 B2 | 10/2018 | Shimono et al. | |
| 2009/0203823 A1* | 8/2009 | Sasada | C09D 11/326 524/386 |
| 2012/0050386 A1* | 3/2012 | Shimizu | C09D 11/324 524/556 |

(Continued)

FOREIGN PATENT DOCUMENTS

| | | |
|---|---|---|
| EP | 4 190 868 A1 | 6/2023 |
| GB | 1 563 669 | 3/1980 |

(Continued)

OTHER PUBLICATIONS

International Search Report issued Feb. 15, 2022, in PCT/JP2021/043086 (with English Translation), 7 pages.

(Continued)

*Primary Examiner* — Manish S Shah
(74) *Attorney, Agent, or Firm* — Oblon, McClelland, Maier & Neustadt, L.L.P.

(57) ABSTRACT

An aqueous ink including a pigment, a fixing resin, and water. The fixing resin includes a constitutional unit derived from (meth)acrylic acid (A), a constitutional unit derived from a cycloalkyl (meth)acrylate (B), and a constitutional unit derived from an alkyl (meth)acrylate (C) whose homopolymer has a glass transition temperature of not higher than 0° C. A content of the constitutional unit derived from the (meth)acrylic acid (A) is not less than 6% by mass and not more than 25% by mass based on the whole constitutional units of the fixing resin, a content of the constitutional unit derived from the cycloalkyl (meth)acrylate (B) is not less than 30% by mass and not more than 90% by mass based on the whole constitutional units of the fixing resin, and a glass transition temperature (Tg) of the fixing resin is not lower than −20° C. and not higher than 40° C.

19 Claims, No Drawings

(56) References Cited

U.S. PATENT DOCUMENTS

| | | | |
|---|---|---|---|
| 2013/0338302 A1 | 12/2013 | Yoshida et al. | |
| 2016/0333209 A1* | 11/2016 | Shimono | B41J 2/01 |
| 2017/0335122 A1* | 11/2017 | Shimomura | B41J 2/01 |
| 2019/0249022 A1 | 8/2019 | Ingle et al. | |
| 2020/0347252 A1 | 11/2020 | Sasada et al. | |
| 2021/0309875 A1 | 10/2021 | Nagano et al. | |

FOREIGN PATENT DOCUMENTS

| | | |
|---|---|---|
| JP | 2011-63746 A | 3/2011 |
| JP | 2011-236281 A | 11/2011 |
| JP | 2011-241281 A | 12/2011 |
| JP | 2012-72361 A | 4/2012 |
| JP | 2015-24508 A | 2/2015 |
| JP | 2016-190930 A | 11/2016 |
| JP | 6123671 B2 | 5/2017 |
| JP | 2017-210604 A | 11/2017 |
| JP | 2018-80255 A | 6/2018 |
| JP | 2020-26454 A | 2/2020 |

OTHER PUBLICATIONS

Extended European Search Report issued Sep. 23, 2024 in European Patent Application No. 21898007.6, 8 pages.

* cited by examiner

AQUEOUS INK

CROSS REFERENCE TO RELATED APPLICATIONS

This application is a National Stage entry under 35 U.S.C. § 371 of PCT/JP2021/043086, filed on Nov. 25, 2021, and claims priority to Japanese Patent Application No. 2020-197109, filed on Nov. 27, 2020. The entire contents of both are incorporated herein by reference.

FIELD OF THE INVENTION

The present invention relates to an aqueous ink.

BACKGROUND OF THE INVENTION

In the market of industrial printing, such as package printing, etc., a resin film has been mainly used as a printing medium from the viewpoint of its good durability. In the case where the resin film is used as the printing medium, the resin film has posed problems concerning fixing properties of ink thereagainst owing to no liquid absorbency for the ink unlike a paper medium, poor wettability by the ink, low polarity of a resin constituting the resin film, etc. The lack of the fixing properties of the ink against the resin film means a high likelihood of peeling of a coating film of the ink from the resin film. If peeling of the ink occurs, the resulting printed material tends to suffer from damage to its beauty/decorativeness, and contents packaged therein, such as foods, etc., tend to be deteriorated in keeping quality. For this reason, it has been required that the ink exhibits good fixing properties against the resin film.

Hitherto, solvent-based inks or UV inks have been used as inks that are fixable on the resin film. However, the solvent-based or UV inks have a large burden on environments or human body owing to volatile organic solvents or residual monomers. Therefore, the use of aqueous inks having a less burden on the environments or human body has been proceeded. However, the aqueous inks have posed a large problem concerning fixing properties thereof against the resin film. Under such circumstances, it has been demanded to provide new technologies for imparting good fixing properties to the aqueous inks.

For example, as an aqueous ink for ink-jet printing which is capable of printing images that are excellent in fixing properties and rub fastness, JP 2017-210604A (Patent Literature 1) discloses an aqueous ink containing resin particles that respectively have a first layer (inner layer) formed of a first resin containing a specific amount of a unit derived from a cyclic aliphatic group-containing ethylenically unsaturated monomer, and a second layer (outer layer) formed of a second resin containing a specific amount of a unit derived from an ionic group-containing ethylenically unsaturated monomer.

SUMMARY OF THE INVENTION

The present invention relates to an aqueous ink containing a pigment, a fixing resin, and water, in which:
the fixing resin contains a constitutional unit derived from (meth)acrylic acid (A), a constitutional unit derived from a cycloalkyl (meth)acrylate (B), and a constitutional unit derived from an alkyl (meth)acrylate (C) whose homopolymer has a glass transition temperature (Tg) of not higher than 0° C.;
a content of the constitutional unit derived from the (meth)acrylic acid (A) is not less than 6% by mass and not more than 25% by mass on the basis of the whole constitutional units of the fixing resin; and
a content of the constitutional unit derived from the cycloalkyl (meth)acrylate (B) is not less than 30% by mass and not more than 90% by mass on the basis of the whole constitutional units of the fixing resin.

DETAILED DESCRIPTION OF THE INVENTION

In the case where printing is conducted on a resin film using an aqueous ink, it is necessary that the aqueous ink is sufficiently fixed on the resin film. However, the technologies described in the Patent Literature 1 have failed to attain sufficient fixing properties of the ink.

The present invention relates to an aqueous ink that is excellent in fixing properties onto a resin film.

The present inventors have found that by using a resin that contains a constitutional unit derived from (meth)acrylic acid, a constitutional unit derived from a cycloalkyl (meth)acrylate, and a constitutional unit derived from an alkyl (meth)acrylate whose homopolymer has a glass transition temperature of not higher than 0° C. as a fixing resin, the aforementioned conventional problems can be solved.

That is, the present invention relates to an aqueous ink containing a pigment, a fixing resin, and water, in which:
the fixing resin contains a constitutional unit derived from (meth)acrylic acid (A), a constitutional unit derived from a cycloalkyl (meth)acrylate (B), and a constitutional unit derived from an alkyl (meth)acrylate (C) whose homopolymer has a glass transition temperature (Tg) of not higher than 0° C.;
a content of the constitutional unit derived from the (meth)acrylic acid (A) is not less than 6% by mass and not more than 25% by mass on the basis of the whole constitutional units of the fixing resin; and
a content of the constitutional unit derived from the cycloalkyl (meth)acrylate (B) is not less than 30% by mass and not more than 90% by mass on the basis of the whole constitutional units of the fixing resin.

In accordance with the present invention, it is possible to provide an aqueous ink that is excellent in fixing properties onto a resin film.

[Aqueous Ink]

The aqueous ink of the present invention contains a pigment, a fixing resin, and water, in which:
the fixing resin contains a constitutional unit derived from (meth)acrylic acid (A), a constitutional unit derived from a cycloalkyl (meth)acrylate (B), and a constitutional unit derived from an alkyl (meth)acrylate (C) whose homopolymer has a glass transition temperature (Tg) of not higher than 0° C.;
a content of the constitutional unit derived from the (meth)acrylic acid (A) is not less than 6% by mass and not more than 25% by mass on the basis of the whole constitutional units of the fixing resin; and
a content of the constitutional unit derived from the cycloalkyl (meth)acrylate (B) is not less than 30% by mass and not more than 90% by mass on the basis of the whole constitutional units of the fixing resin.

Incidentally, the term "aqueous" as used herein means that water has a largest content among components of a medium contained in the aqueous ink.

According to the present invention, it is possible to provide an aqueous ink that is excellent in fixing properties onto a resin film. The reason why the aforementioned advantageous effect can be attained by the present invention is considered as follows though it is not clearly determined yet.

The fixing resin contained in the aqueous ink of the present invention contains the constitutional unit derived from the cycloalkyl (meth)acrylate (B). It is therefore considered that since the cycloalkyl ester moiety of the cycloalkyl (meth)acrylate (B) has a close interaction with the resin film, the ink can be improved in fixing properties onto the resin film.

In addition, it is considered that since the fixing resin contains the constitutional unit derived from the alkyl (meth) acrylate (C) whose homopolymer has a glass transition temperature (Tg) of not higher than 0° C., it becomes possible to reduce Tg of the fixing resin, so that the resulting ink can be improved in wettability to the resin film and therefore can be improved in fixing properties onto the resin film.

<Aqueous Ink>

The aqueous ink of the present invention contains at least a pigment, a fixing resin, and water, and can exhibit excellent fixing properties when used in ink-jet printing. Therefore, it is preferred that the aqueous ink is used as an ink for ink-jet printing.

Examples of the suitable configuration of the pigment used in the aqueous ink of the present invention include (i) a configuration of a pigment that can be maintained in a dispersed state without using any dispersant, i.e., a configuration of a self-dispersible pigment, (ii) a configuration of pigment particles that are obtained by dispersing the pigment with a low-molecular weight or high-molecular weight surfactant, and (iii) a configuration of polymer particles containing the pigment. Among these configurations, from the viewpoint of improving dispersion stability of the pigment and fixing properties of the resulting ink, preferred is the configuration of the polymer particles containing the pigment.

The "polymer particles containing the pigment" as used herein (hereinafter also referred to as "pigment-containing polymer particles") mean particles having a configuration in which the pigment is included in the polymer, particles having a configuration in which the pigment is partially exposed to a surface of respective particles formed of the polymer and the pigment, or particles having a configuration in which the polymer is adsorbed to a part of the pigment, as well as a mixture of particles having these configurations. Among the particles having these configurations, preferred are the particles having the configuration in which the pigment is included in the polymer.

[Pigment]

The pigment used in the present invention may be either an inorganic pigment or an organic pigment.

Examples of the inorganic pigment include carbon blacks, metal oxides and the like. The carbon blacks are preferably used for black inks. Examples of the carbon blacks include furnace blacks, lamp blacks, acetylene blacks, channel blacks and the like. As a pigment for white inks, there may be used metal oxides, such as titanium dioxide, zinc oxide, silica, alumina, magnesium oxide, etc., and the like.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The hue of the pigment is not particularly limited. In chromatic inks, there may be used any of chromatic pigments, such as a yellow pigment, a magenta pigment, a cyan pigment, a red pigment, a blue pigment, an orange pigment, a green pigment, etc.

The aforementioned pigments may be used alone or in the form of a mixture of any two or more thereof.

[Pigment-Containing Polymer Particles]

The polymer constituting the pigment-containing polymer particles (hereinafter also referred to as a "polymer a") is not particularly limited as long as the polymer has at least an ability of dispersing the pigment.

As the polymer a, there may be mentioned a vinyl-based resin obtained by addition-polymerization of vinyl monomers, a polyester resin, a polyurethane resin, and the like. Among these resins, from the viewpoint of improving dispersion stability of the pigment and fixing properties of the resulting ink, preferred is at least one resin selected from the group consisting of a vinyl-based resin and a polyester resin, and more preferred is a vinyl-based resin.

The polymer a may be either an adequately synthesized product or a commercially available product.

The pigment-containing polymer particles are preferably in the form of crosslinked polymer particles containing the pigment (hereinafter also referred to as "pigment-containing crosslinked polymer particles") which are obtained by further subjecting the polymer particles containing the pigment to crosslinking treatment with a crosslinking agent, and more preferably in the form of pigment-containing crosslinked vinyl polymer particles.

The polymer a before being subjected to the crosslinking treatment may be either a water-soluble polymer or a water-insoluble polymer. Among these polymers, preferred is a water-insoluble polymer. Even though the polymer used is a water-soluble polymer, the polymer is transformed into a water-insoluble polymer by subjecting the polymer to the crosslinking treatment.

The term "water-insoluble" of the polymer as used in the present specification means that when the polymer is dried to a constant weight at 105° C. for 2 hours and then dissolved in 100 g of water at 25° C., the solubility in water of the polymer is less than 10 g. In the case where the polymer is an anionic polymer, the aforementioned solubility means a solubility of the polymer in which 100% of anionic groups are neutralized with sodium hydroxide.

[Vinyl-Based Resin]

In the case where the polymer a is a vinyl-based resin, from the viewpoint of improving dispersion stability of the pigment, it is preferred that the vinyl-based resin contains a constitutional unit derived from (a-1) an ionic monomer, and further contains a constitutional unit derived from (a-2) a hydrophobic monomer and/or a constitutional unit derived from (a-3) a nonionic monomer.

[(a-1) Ionic Monomer]

The ionic monomer (a-1) is preferably an anionic monomer, such as a carboxylic acid monomer, a sulfonic acid monomer, etc. Among these monomers, preferred is a carboxylic acid monomer.

As the carboxylic acid monomer, there may be mentioned at least one monomer selected from the group consisting of (meth)acrylic acid, crotonic acid, itaconic acid, maleic acid, fumaric acid, and citraconic acid. Among these monomers, preferred is (meth)acrylic acid. The term "(meth)acrylic acid" as used herein means at least one compound selected from the group consisting of acrylic acid and methacrylic acid.

[(a-2) Hydrophobic Monomer]

The term "hydrophobic" of the hydrophobic monomer (a-2) as used herein means that when the monomer is dissolved in 100 g of ion-exchanged water at 25° C. until reaching a saturation concentration thereof, the solubility in water of the monomer is less than 10 g.

Specific examples of the hydrophobic monomer (a-2) include those monomers described in the paragraphs [0020] to [0022] of JP 2018-83938A. Among these monomers, preferred are an alkyl (meth)acrylate containing an alkyl group having not less than 1 and not more than 18 carbon atoms, in particular, not less than 1 and not more than 10 carbon atoms, an aromatic group-containing monomer containing an aromatic group having not less than 6 and not more than 22 carbon atoms, a macromonomer containing a polymerizable functional group at one terminal end thereof, and the like, and more preferred is at least one monomer selected from the group consisting of styrene, α-methyl styrene, and benzyl (meth)acrylate.

The macromonomer containing a polymerizable functional group at one terminal end thereof is in the form of a compound having a number-average molecular weight of not less than 500 and not more than 100,000 and preferably not less than 1,000 and not more than 10,000. As the polymerizable functional group, there may be mentioned an acryloyloxy group or a methacryloyloxy group.

As the macromonomer, there is preferably used an aromatic group-containing monomer-based macromonomer. Examples of an aromatic group-containing monomer constituting the aromatic group-containing monomer-based macromonomer include the same aromatic group-containing monomers as described above.

Specific examples of commercially available products of the styrene-based macromonomer include "AS-6(S)", "AN-6(S)", and "HS-6(S)" (tradenames) all available from Toagosei Co., Ltd., and the like.

[(a-3) Nonionic Monomer]

The nonionic monomer (a-3) is in the form of a monomer having a high affinity to water or a water-soluble organic solvent. Examples of the nonionic monomer (a-3) include those monomers containing a hydroxy group or a polyalkylene glycol chain.

Specific examples of the component (a-3) include those monomers described in the paragraph [0018] of JP 2018-83938A. Among these monomers, preferred is at least one monomer selected from the group consisting of methoxy polyethylene glycol (n=1 to 30) (meth)acrylate and polypropylene glycol (n=2 to 30) (meth)acrylate.

As to the aforementioned components (a-1) to (a-3), the monomers included in the respective components may be used alone or in the form of a mixture of any two or more thereof.

(Contents of Respective Constitutional Units in Vinyl-Based Resin)

The contents of the respective constitutional units derived from the components (a-1) to (a-3) in the vinyl-based resin are as follows from the viewpoint of improving dispersion stability of the pigment.

The content of the component (a-1) is preferably not less than 5% by mass, more preferably not less than 10% by mass, and even more preferably not less than 12% by mass, and is also preferably not more than 45% by mass, more preferably not more than 40% by mass, and even more preferably not more than 35% by mass.

The content of the component (a-2) is preferably not less than 30% by mass, more preferably not less than 40% by mass, and even more preferably not less than 50% by mass, and is also preferably not more than 90% by mass, more preferably not more than 80% by mass, and even more preferably not more than 70% by mass.

In the case where the component (a-3) is included, the content of the component (a-3) is preferably not less than 2% by mass, more preferably not less than 5% by mass, and even more preferably not less than 10% by mass, and is also preferably not more than 45% by mass, more preferably not more than 40% by mass, and even more preferably not more than 35% by mass.

The mass ratio of the component (a-1) to the component (a-2) [component (a-1)/component (a-2)] is preferably not less than 0.15, more preferably not less than 0.2, and even more preferably not less than 0.25, and is also preferably not more than 1.2, more preferably not more than 0.8, and even more preferably not more than 0.5.

(Production of Vinyl-Based Resin)

The vinyl-based resin may be produced by copolymerizing a mixture of the monomers by known polymerization methods. As the polymerization methods, preferred is a solution polymerization method.

The solvent used in the solution polymerization method is not particularly limited, and is preferably a polar solvent, such as water, aliphatic alcohols, ketones, ethers, esters and the like. Among these solvents, more preferred are water, methanol, ethanol, acetone, methyl ethyl ketone and the like.

The polymerization may be carried out in the presence of a polymerization initiator or a polymerization chain transfer agent. Examples of the polymerization initiator include persulfuric acid salts, such as ammonium persulfate, potassium persulfate, etc., water-soluble azo polymerization initiators, and the like. As the polymerization chain transfer agent, preferred are mercaptans, and the like.

The polymerization temperature may vary depending upon the kinds of polymerization initiator, monomers, and solvents used, etc. The polymerization temperature is preferably not lower than 30° C. and more preferably not lower than 50° C., and is also preferably not higher than 95° C. and more preferably not higher than 80° C.

The polymerization is preferably conducted in a nitrogen gas atmosphere or an inert gas atmosphere.

The vinyl-based resin is preferably neutralized with a neutralizing agent as described hereinbelow.

The weight-average molecular weight of the vinyl-based resin is preferably not less than 5,000, more preferably not less than 8,000, and even more preferably not less than 10,000, and is also preferably not more than 150,000, more preferably not more than 100,000, and even more preferably not more than 80,000, from the viewpoint of improving dispersion stability of the pigment and fixing properties of the resulting ink.

From the same viewpoint as described above, the acid value of the polymer a is preferably not less than 50 mgKOH/g, more preferably not less than 70 mgKOH/g, and even more preferably not less than 90 mgKOH/g, and is also preferably not more than 400 mgKOH/g, more preferably not more than 300 mgKOH/g, and even more preferably not more than 200 mgKOH/g.

The weight-average molecular weight and the acid value of the polymer may be measured by the respective methods described in Examples below.

[Polyester Resin]

In the case where the polymer a is a polyester resin, the polyester resin contains a constitutional unit derived from an alcohol component and a constitutional unit derived from a carboxylic acid.

(Alcohol Component)

Examples of the alcohol component as a raw material monomer of the polyester resin include polyols, such as an aromatic polyol, an aliphatic polymer, etc. It is preferred that the alcohol component includes an aromatic diol.

The aromatic diol is preferably in the form of an alkyleneoxide adduct of bisphenol A.

Specific examples of the preferred alkyleneoxide adduct of bisphenol A include those compounds represented by the following general formula (I-1).

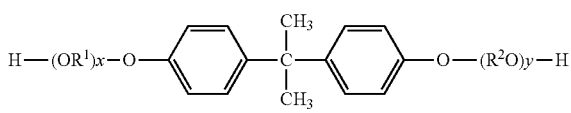

(I-1)

In the general formula (I-1), $OR^1$ and $R^2O$ are respectively an oxyalkylene group, preferably each independently an oxyalkylene group having not less than 1 and not more than 4 carbon atoms, and more preferably an oxyethylene group or an oxypropylene group.

The suffixes x and y each represent an average molar number of addition of the alkyleneoxide. In addition, from the viewpoint of attaining good reactivity with the carboxylic acid component, an average value of sums of x and y is preferably not less than 2, and is also preferably not more than 7, more preferably not more than 5, and even more preferably not more than 3.

In addition, the $OR^1$ groups in the number of x and the $R^2O$ groups in the number of y may be respectively the same or different from each other. From the viewpoints of improving fixing properties of the resulting ink onto a printing medium, the $R^1O$ groups and the $R^2O$ groups are respectively preferably identical to each other. As the alkyleneoxide adduct of bisphenol A, preferred are a propyleneoxide adduct of bisphenol A and an ethyleneoxide adduct of bisphenol A, and more preferred is a propyleneoxide adduct of bisphenol A.

The content of the alkyleneoxide adduct of bisphenol A in the alcohol component is preferably not less than 50 mol %, more preferably not less than 60 mol % and even more preferably not less than 70 mol %, and is also not more than 100 mol %, from the viewpoint of improving fixing properties of the resulting ink.

As the alcohol component as a raw material monomer of the polyester resin, the other alcohol component(s) may also be used in addition to the alkyleneoxide adduct of bisphenol A. Specific examples of the other alcohol component(s) include ethylene glycol, propylene glycol (1,2-propanediol), glycerin, pentaerythritol, trimethylolpropane, hydrogenated bisphenol A, sorbitol, alkylene ($C_2$ to $C_4$) oxide adducts of these compounds (average molar number of addition of the alkyleneoxide: not less than 1 and not more than 16), and the like.

(Carboxylic Acid Component)

Examples of the carboxylic acid component as a raw material monomer of the polyester resin include carboxylic acids as well as anhydrides and alkyl (having not less than 1 and not more than 3 carbon atoms) esters of these carboxylic acids, and the like.

Specific examples of the carboxylic acid component include an aromatic dicarboxylic acid, an aliphatic dicarboxylic acid, an alicyclic dicarboxylic acid, a trivalent or higher-valent polycarboxylic acid, and the like. Among these carboxylic acid components, preferred is at least one acid component selected from the group consisting of an aromatic dicarboxylic acid and an aliphatic dicarboxylic acid.

As the aromatic dicarboxylic acid, preferred are phthalic acid, isophthalic acid, and terephthalic acid, and more preferred is terephthalic acid.

Examples of the aliphatic dicarboxylic acid include an unsaturated aliphatic dicarboxylic acid and a saturated aliphatic dicarboxylic acid. As the unsaturated aliphatic dicarboxylic acid, preferred are fumaric acid and maleic acid, and more preferred is fumaric acid. As the saturated aliphatic dicarboxylic acid, preferred are adipic acid and succinic acid. As the alicyclic dicarboxylic acid, preferred are cyclohexanedicarboxylic acid, decalinedicarboxylic acid and tetrahydrophthalic acid. As the trivalent or higher-valent polycarboxylic acid, preferred are trimellitic acid and pyromellitic acid.

The aforementioned carboxylic acid components may be used alone or in combination of any two or more thereof.

Among the aforementioned carboxylic acid components, preferred are the aromatic dicarboxylic acid and the aliphatic dicarboxylic acid, more preferred is the aliphatic dicarboxylic acid, even more preferred is the unsaturated aliphatic dicarboxylic acid, and further even more preferred is fumaric acid. In addition, it is preferred that the unsaturated aliphatic dicarboxylic acid is used in combination with the aromatic dicarboxylic acid and/or the alicyclic dicarboxylic acid.

The content of the unsaturated aliphatic dicarboxylic acid in the carboxylic acid component is preferably not less than 25 mol %, more preferably not less than 40 mol %, even more preferably not less than 60 mol %, and further even more preferably not less than 70 mol %, and is also not more than 100 mol %.

(Production of Polyester Resin)

The polyester resin may be obtained by subjecting at least the alcohol component and the carboxylic acid component to polycondensation reaction. The polyester resin may be produced, for example, by subjecting the alcohol component and the carboxylic acid component to polycondensation reaction at a temperature of not lower than 180° C. and not higher than 250° C. in an inert gas atmosphere, if required in the presence of an esterification catalyst. The suitable configurations and the suitable contents of the alcohol component and the carboxylic acid component are respectively the same as those described previously.

The polycondensation reaction for production of the polyester resin is preferably conducted in the presence of the esterification catalyst.

Examples of the esterification catalyst include a metal compound, such as a tin catalyst, a titanium catalyst, antimony trioxide, zinc acetate, germanium dioxide, etc., and the like. Of these esterification catalysts, the tin catalyst is preferably used from the viewpoint of attaining a high reaction efficiency. As the tin catalyst, preferred are dibutyl tin oxide, tin (II) di(2-ethyl hexanoate), and salts of these compounds, and the like, and more preferred is tin (II) di(2-ethyl hexanoate).

In addition, if required, there may be further used an esterification co-catalyst, such as 3,4,5-trihydroxybenzoic acid, etc. Moreover, a radical polymerization inhibitor, such as 4-tert-butyl catechol, hydroquinone, etc., may be used in combination with the aforementioned components, if required.

The acid value of the polyester resin a is preferably not less than 5 mgKOH/g, more preferably not less than 10 mgKOH/g, and even more preferably not less than 15 mgKOH/g, and is also preferably not more than 70 mgKOH/g, more preferably not more than 50 mgKOH/g, and even more preferably not more than 40 mgKOH/g, from the viewpoint of improving fixing properties of the resulting ink.

The weight-average molecular weight of the polyester resin is preferably not less than 8,000, more preferably not less than 10,000, and even more preferably not less than 12,000 from the viewpoint of improving fixing properties of the resulting ink, and is also preferably not more than 200,000, more preferably not more than 100,000, and even more preferably not more than 50,000 from the viewpoint of improving dispersion stability of the pigment in the resulting ink.

The acid value and the weight-average molecular weight of the polyester resin may be respectively adjusted to desired values by appropriately controlling the kinds and compounding ratios of the monomers used as well as the polycondensation reaction conditions such as reaction temperature and reaction time. In addition, the acid value and the weight-average molecular weight of the polyester resin may be measured by the respective methods described in Examples below.

[Production of Pigment-Containing Polymer Particles]

The pigment-containing polymer particles may be efficiently produced in the form of a pigment water dispersion thereof by a process including the following steps 1 and 2.

Step 1: subjecting a pigment mixture containing the pigment, the polymer a, an organic solvent, and water to dispersion treatment to obtain a dispersion treatment product; and Step 2: removing the organic solvent from the dispersion treatment product obtained in the step 1 to obtain a water dispersion of pigment-containing polymer particles A (hereinafter also referred to as a "pigment water dispersion (i)").

In the case where the polymer a is in the form of a vinyl-based resin, it is preferred that the aforementioned process further includes the following step 3.

Step 3: adding a crosslinking agent to the pigment water dispersion (i) obtained in the step 2 to subject the pigment-containing polymer particles to crosslinking treatment, thereby obtaining a water dispersion (I) of pigment-containing crosslinked polymer particles (hereinafter also referred to as a "pigment water dispersion (I)").

The pigment-containing polymer particles according to the present invention also include the pigment-containing crosslinked polymer particles obtained in the step 3.

(Step 1)

The pigment mixture used in the step 1 is preferably obtained by the method in which the polymer a is first dissolved in the organic solvent, and then the pigment and water are added and mixed, if required together with a neutralizing agent, a surfactant, etc., into the resulting organic solvent solution to prepare a dispersion liquid of an oil-in-water type.

The organic solvent used in the step 1 is not particularly limited. Examples of the preferred organic solvent used in the step 1 include ketones, ethers, esters, aliphatic alcohols having not less than 1 and not more than 3 carbon atoms, and the like. Among these organic solvents, from the viewpoint of improving wettability to the pigment and adsorptivity of the polymer a to the pigment, more preferred are ketones having not less than 4 and not more than 8 carbon atoms, even more preferred are methyl ethyl ketone and methyl isobutyl ketone, and further even more preferred is methyl ethyl ketone. In the case where the vinyl-based resin as the polymer a is synthesized by a solution polymerization method, the solvent used in the solution polymerization method may be directly used as such in the step 1.

In the case where the polymer a contains acid groups, it is preferred that the acid groups are at least partially neutralized using a neutralizing agent. It is considered that by neutralizing the acid groups of the polymer a, electric charge repulsion force between the pigment particles which is developed after the neutralization tends to become large, so that it is possible to suppress flocculation of the pigment particles in the resulting aqueous ink and thereby improve dispersion stability of the pigment in the ink.

When neutralizing the acid groups of the polymer a, the neutralization is preferably conducted such that the pH value of the resulting dispersion falls within the range of not less than 7 and not more than 11.

Examples of the neutralizing agent include bases such as sodium hydroxide, potassium hydroxide, ammonia, various amines and the like. Among these neutralizing agents, preferred are sodium hydroxide and ammonia.

In addition, the polymer a may be previously neutralized.

The equivalent of the neutralizing agent used is preferably not less than 20 mol %, more preferably not less than 30 mol %, and even more preferably not less than 40 mol %, and is also preferably not more than 150 mol %, more preferably not more than 120 mol %, and even more preferably not more than 100 mol %, from the viewpoint of improving dispersion stability of the pigment in the resulting ink.

The equivalent of the neutralizing agent used as defined herein may be calculated according to the following formula wherein the polymer a before being neutralized is expressed by a polymer a'.

Equivalent (mol %) of neutralizing agent used=
[{mass (g) of neutralizing agent added/equivalent of neutralizing agent}/[{acid value (mgKOH/g) of polymer a'×mass (g) of polymer a'}(56×1,000)]]×100.

In the dispersion treatment of the step 1, the pigment particles may be atomized into fine particles having a desired particle size only by substantial dispersion treatment in which a shear stress is applied to the pigment particles. However, it is preferred that the pigment mixture is first subjected to preliminary dispersion treatment, and then further to the substantial dispersion treatment, from the viewpoint of obtaining a uniform pigment water dispersion.

Examples of a disperser used in the preliminary dispersion treatment include ordinarily mixing and stirring devices, such as an anchor blade, a disper blade, etc.

Examples of the means for applying a shear stress to the pigment particles which may be used in the substantial dispersion treatment include kneading machines such as roll mills, kneaders, etc.; high-pressure homogenizers such as "Microfluidizer", etc.; and media-type dispersers such as paint shakers, beads mills, etc. Among these devices, the high-pressure homogenizers and beads mills are preferably used from the viewpoint of reducing the particle size of the pigment.

In the case where the dispersion treatment is conducted using the high-pressure homogenizers, by suitably controlling the number of passes through the devices under the dispersing pressure of not less than 20 MPa, it is possible to adjust the particle size of the pigment to a desired value and also suitably control the average particle size of the pigment particles in the below-mentioned pigment water dispersion (I).

(Step 2)

The removal of the organic solvent in the step 2 may be conducted by conventionally known methods. The organic solvent is preferably substantially completely removed from the thus obtained pigment water dispersion (i). However, the residual organic solvent may be present, for example, in an amount of not more than 0.1% by mass, in the resulting pigment water dispersion (i), unless the objects and advantageous effects of the present invention are adversely affected by the residual organic solvent.

In addition, in order to remove coarse particles, etc., from the pigment water dispersion, it is preferred that after further subjecting the water dispersion from which the organic solvent has been removed to centrifugal separation, a liquid layer portion of the dispersion is subjected to filtration treatment through a filter, etc., to obtain a filtrate being passed through the filter, etc., as the pigment water dispersion (i).

(Step 3)

The step 3 is an optional step. In the step 3, a crosslinking agent is added to the pigment water dispersion (i) obtained in the step 2 to subject a part of carboxy groups of the polymer a constituting the pigment-containing polymer particles to crosslinking treatment, so that a crosslinked structure is formed in a surface layer portion of the respective pigment-containing polymer particles to thereby obtain a pigment water dispersion (I) of pigment-containing crosslinked polymer particles. It is considered that by forming such a crosslinked structure, the polymer formed by crosslinking the polymer a is firmly adsorbed or fixed onto the surface of the pigment, and the pigment is inhibited from suffering from flocculation thereof, so that the resulting ink can be further improved in dispersion stability.

As the crosslinking agent, preferred is a polyfunctional epoxy compound containing not less than 2 epoxy groups in a molecule thereof, more preferred is a compound containing not less than 2 glycidyl ether groups in a molecule thereof, and even more preferred is a polyglycidyl ether compound of a polyhydric alcohol containing a hydrocarbon group having not less than 3 and not more than 4 carbon atoms in a molecule thereof.

The molecular weight of the crosslinking agent is preferably not less than 120 and more preferably not less than 150, and is also preferably not more than 2,000 and more preferably not more than 1,500, from the viewpoint of improving facilitation of the crosslinking reaction, etc.

The epoxy equivalent of the crosslinking agent is preferably not less than 90 and more preferably not less than 100, and is also preferably not more than 300 and more preferably not more than 200.

Examples of the suitable crosslinking agent include polyglycidyl ethers, such as trimethylolpropane polyglycidyl ether (water solubility rate: 27% by mass), pentaerythritol polyglycidyl ether (water solubility rate: 0% by mass), etc., and the like.

The crosslinking rate of the polymer in the step 3 as calculated in terms of a ratio of a mole equivalent number of crosslinkable functional groups of the crosslinking agent to a mole equivalent number of the carboxy groups of the polymer a is preferably not less than 15 mol %, more preferably not less than 20 mol %, and even more preferably not less than 25 mol %, and is also preferably not more than 80 mol %, more preferably not more than 60 mol %, and even more preferably not more than 50 mol %, from the viewpoint of improving fixing properties of the resulting ink, etc.

From the same viewpoint as described above, the temperature used in the crosslinking treatment is preferably not lower than 40° C. and more preferably not lower than 50° C., and is also preferably not higher than 90° C. and more preferably not higher than 80° C.

In the pigment water dispersion (I) of the pigment-containing crosslinked polymer particles obtained in the step 3, in the case where the polymer constituting the pigment-containing crosslinked polymer particles has a crosslinked structure, the acid value of the polymer is preferably not less than 40 mgKOH/g, more preferably not less than 60 mgKOH/g, and even more preferably not less than 80 mgKOH/g, and is also preferably not more than 160 mgKOH/g, more preferably not more than 130 mgKOH/g, and even more preferably not more than 100 mgKOH/g, from the viewpoint of ensuring storage stability of the pigment water dispersion (I) when used in the aqueous ink of the present invention. In the present invention, the acid value of the polymer having such a crosslinked structure may be calculated by multiplying the acid value of the polymer a before being crosslinked, by the crosslinking rate.

The concentration of non-volatile components in the resulting pigment water dispersion (I) (solid content of the pigment water dispersion (I)) is preferably not less than 10% by mass and more preferably not less than 15% by mass, and is also preferably not more than 45% by mass and more preferably not more than 40% by mass, from the viewpoint of improving dispersion stability of the pigment water dispersion.

The solid content may be measured by the method described in Examples below.

The content of the pigment in the pigment water dispersion (I) is preferably not less than 5% by mass, more preferably not less than 10% by mass, and even more preferably not less than 12% by mass, and is also preferably not more than 45% by mass and more preferably not more than 40% by mass, from the viewpoint of improving dispersion stability of the pigment in the ink.

The mass ratio of the (crosslinked) polymer constituting the pigment-containing (crosslinked) polymer particles to the pigment [(crosslinked) polymer/pigment] in the pigment water dispersion (I) is preferably not less than 0.08 and more preferably not less than 0.1, and is also preferably not more than 0.8 and more preferably not more than 0.7.

The average particle size of the pigment-containing (crosslinked) polymer particles is preferably not less than 50 nm, more preferably not less than 70 nm, and even more preferably not less than 80 nm, and is also preferably not more than 400 nm, more preferably not more than 300 nm, and even more preferably not more than 200 nm, from the viewpoint of improving dispersion stability of the pigment in the resulting ink.

The average particle size may be measured by the method descried in Examples below.

<Fixing Resin>

The aqueous ink of the present invention contains a fixing resin from the viewpoint of improving fixing properties of the ink and rub fastness of the resulting printed material.

The fixing resin contains a constitutional unit derived from (meth)acrylic acid, a constitutional unit derived from a cycloalkyl (meth)acrylate, and a constitutional unit derived from an alkyl (meth)acrylate whose homopolymer has a glass transition temperature (Tg) of not higher than 0° C., and it is preferred that the fixing resin is formed of a resin solely. That is, the fixing resin is preferably in the form of pigment-free resin particles (hereinafter also referred to as "resin particles B").

The resin particles B may have a structure whose composition is changed from a center of the respective resin particles toward an outer shell portion thereof, for example, a core/shell structure, or a structure whose composition is substantially homogeneous over a region from the center of the respective resin particles toward the outer shell portion thereof. It is preferred that the resin particles B have the homogeneous structure.

The fixing resin is preferably used in the form of a water dispersion prepared by dispersing the resin particles B in water.

The (meth)acrylic acid (A) constituting the fixing resin is at least one compound selected from the group consisting of acrylic acid and methacrylic acid. Of these compounds, preferred is acrylic acid.

The number of carbon atoms in a cycloalkyl group of the cycloalkyl (meth)acrylate (B) constituting the fixing resin is preferably not less than 4 and not more than 12, and more preferably not less than 5 and not more than 8. Examples of the suitable cycloalkyl (meth)acrylate include at least one compound selected from the group consisting of cyclopentyl (meth)acrylate, cyclohexyl (meth)acrylate and cycloheptyl (meth)acrylate. Of these compounds, preferred is at least one compound selected from the group consisting of cyclopentyl acrylate, cyclohexyl acrylate and cycloheptyl acrylate, and more preferred is cyclohexyl acrylate.

As the alkyl (meth)acrylate (C) whose homopolymer has a glass transition temperature (Tg) of not higher than 0° C., there may be mentioned an alkyl (meth)acrylate containing an alkyl group preferably having not less than 1 and not more than 10 carbon atoms and more preferably not less than 2 and not more than 8 carbon atoms. Examples of the suitable alkyl (meth)acrylate include at least one compound selected from the group consisting of ethyl (meth)acrylate, (iso)propyl (meth)acrylate, (iso)butyl (meth)acrylate, pentyl (meth)acrylate, hexyl (meth)acrylate, octyl (meth)acrylate and 2-ethylhexyl (meth)acrylate. Of these alkyl (meth)acrylates, preferred is at least one compound selected from the group consisting of ethyl acrylate, butyl acrylate, isobutyl acrylate, and hexyl acrylate.

As to the aforementioned monomer components (A) to (C), the respective monomers included in each monomer component may be used alone or in the form of a mixture of any two or more thereof.

The fixing resin may also contain a constitutional unit derived from monomer(s) other than the aforementioned monomers (A) to (C) unless the advantageous effects of the present invention are adversely affected thereby. Examples of the other monomer(s) include an ionic monomer, an aromatic group-containing hydrophobic monomer, and a nonionic monomer, other than the aforementioned monomers (A) to (C).

(Contents of Respective Constitutional Units in Fixing Resin)

The contents of the constitutional units derived from the respective monomers in the fixing resin are as follows from the viewpoint of improving fixing properties of the resulting ink on a printing medium.

The content of the constitutional unit derived from the (meth)acrylic acid (A) is not less than 6% by mass, preferably not less than 7% by mass, more preferably not less than 8% by mass, and even more preferably not less than 9% by mass, and is also not more than 25% by mass, preferably not more than 24% by mass, more preferably not more than 23% by mass, and even more preferably not more than 22% by mass.

The content of the constitutional unit derived from the cycloalkyl (meth)acrylate (B) is not less than 30% by mass, preferably not less than 35% by mass, more preferably not less than 40% by mass, and even more preferably not less than 45% by mass, and is also not more than 90% by mass, preferably not more than 85% by mass, more preferably not more than 80% by mass, and even more preferably not more than 75% by mass.

The content of the constitutional unit derived from the alkyl (meth)acrylate (C) is preferably not less than 2% by mass, more preferably not less than 4% by mass, and even more preferably not less than 6% by mass, and is also preferably not more than 60% by mass, more preferably not more than 55% by mass, and even more preferably not more than 50% by mass.

The fixing resin may be produced by copolymerizing a monomer mixture containing the aforementioned monomer (A), monomer (B), and monomer (C), etc., by conventionally known polymerization methods.

The weight-average molecular weight of the fixing resin is preferably not less than 20,000, more preferably not less than 40,000, and even more preferably not less than 80,000, and is also preferably not more than 2,000,000, more preferably not more than 1,000,000, even more preferably not more than 500,000, and further even more preferably not more than 200,000, from the viewpoint of improving fixing properties of the resulting ink.

The acid value of the fixing resin is preferably not less than 20 mgKOH/g, more preferably not less than 30 mgKOH/g, and even more preferably not less than 40 mgKOH/g, and is also preferably not more than 200 mgKOH/g, more preferably not more than 180 mgKOH/g, even more preferably not more than 150 mgKOH/g, and further even more preferably not more than 120 mgKOH/g, from the viewpoint of improving fixing properties of the resulting ink.

The weight-average molecular weight and the acid value of the fixing resin may be measured by the respective methods described in Examples below.

The glass transition temperature (Tg) of the fixing resin is preferably not lower than −20° C., more preferably not lower than −15° C., even more preferably not lower than −10° C., and further even more preferably not lower than −5° C., and is also preferably not higher than 50° C., more preferably not higher than 40° C., even more preferably not higher than 30° C., and further even more preferably not higher than 20° C., from the viewpoint of improving fixing properties of the resulting ink.

The glass transition temperature of the fixing resin may be calculated from mass (weight) fractions of the monomers in the respective polymer portions according to the following Fox equation.

$$1/Tg = (W_1/Tg_1) + (W_2/Tg_2) + \ldots + (W_m/Tg_m)$$

$$W_1 + W_2 + \ldots W_m = 1$$

In the aforementioned Fox equation, Tg represents a glass transition temperature of the polymer; and $Tg_1, Tg_2, \ldots Tg_m$ represent glass transition temperatures of the respective homopolymer of the respective monomers to be polymerized. The unit of the temperature is K. In addition, $W_1, W_2, \ldots, W_m$ represent mass fractions of the respective monomers.

As the glass transition temperatures of the respective homopolymer of the respective monomers in the aforementioned Fox equation, there may be used the values described in "Polymer Handbook Third Edition" (Wiley-Interscience, 1989).

The average particle size of the resin particles B in the aqueous ink is preferably not less than 10 nm, more preferably not less than 20 nm, and even more preferably not less than 30 nm, and is also preferably not more than 300 nm, more preferably not more than 200 nm, and even more preferably not more than 150 nm, from the viewpoint of improving storage stability of the resulting ink.

The aqueous ink of the present invention may also contain various additives that may be usually used in aqueous inks, such as a water-soluble organic solvent, a surfactant, a humectant, a wetting agent, a viscosity modifier, a defoaming agent, an antiseptic agent, a mildew-proof agent, a rust preventive, etc.

(Water-Soluble Organic Solvent)

As the water-soluble organic solvent, there may be mentioned a glycol ether, a polyhydric alcohol, a nitrogen-containing heterocyclic compound, such as 2-pyrrolidone, etc., an alkanol amine, and the like. Of these water-soluble organic solvents, preferred is at least one solvent selected from the group consisting of a glycol ether and a polyhydric alcohol.

As the glycol ether, preferred are an alkylene glycol monoalkyl ether and an alkylene glycol dialkyl ether, and more preferred is an alkylene glycol monoalkyl ether. Examples of the suitable alkylene glycol monoalkyl ether include ethylene glycol monoisopropyl ether, diethylene glycol monoisopropyl ether, diethylene glycol monoisobutyl ether, and the like.

Examples of the polyhydric alcohol include an alkanediol having not less than 2 and not more than 6 carbon atoms, such as propylene glycol, diethylene glycol, 1,2-hexanediol, etc., glycerin, and the like.

(Surfactant)

The surfactant is preferably a nonionic surfactant, and more preferably at least one surfactant selected from the group consisting of an acetylene glycol-based surfactant and a silicone-based surfactant.

Examples of the acetylene glycol-based surfactant include acetylene-based diols, such as 2,4,7,9-tetramethyl-5-decyne-4,7-diol, 3,6-dimethyl-4-octyne-3,6-diol, 3,5-dimethyl-1-hexyne-3-ol, 2,4-dimethyl-5-hexyne-3-ol, etc., and ethyleneoxide adducts of these acetylene glycols.

Examples of commercially available products of the acetylene glycol-based surfactant include "SURFYNOL" series products and "OLFINE" series products both available from Nissin Chemical Co., Ltd., and the like.

The silicone-based surfactant is preferably a polyether-modified silicone. Examples of commercially available products of the polyether-modified silicone include "KF" series products available from Shin-Etsu Chemical Co., Ltd., such as "KF-353", "KF-355A", "KF-642", "KF-6011", etc., "SILFACE SAG" series products available from Nissin Chemical Co., Ltd., "BYK" series products available from BYK Chemie Japan K.K., and the like.

The aqueous ink of the present invention may be efficiently produced by mixing the pigment, the fixing resin, and water, if required together with the water-soluble organic solvent and the surfactant, and further with the other additives, etc. The method of mixing these components is not particularly limited.

<Contents of Respective Components in Aqueous Ink, Etc.>

The contents of the respective components in the aqueous ink of the present invention as well as properties of the ink are as follows from the viewpoint of improving fixing properties of the ink onto a printing medium.

(Content of Pigment)

The content of the pigment in the aqueous ink is preferably not less than 2% by mass, more preferably not less than 3% by mass, and even more preferably not less than 4% by mass, and is also preferably not more than 15% by mass, more preferably not more than 12% by mass, and even more preferably not more than 10% by mass.

(Content of Pigment-Containing Polymer Particles)

The content of the pigment-containing polymer particles in the aqueous ink is preferably not less than 3% by mass, more preferably not less than 4% by mass, and even more preferably not less than 5% by mass, and is also preferably not more than 20% by mass, more preferably not more than 15% by mass, and even more preferably not more than 12% by mass.

(Content of Fixing Resin)

The content of the fixing resin in the aqueous ink is preferably not less than 0.5% by mass, more preferably not less than 1% by mass, and even more preferably not less than 2% by mass, and is also preferably not more than 10% by mass, more preferably not more than 8% by mass, and even more preferably not more than 6% by mass.

The mass ratio of the fixing resin to the pigment-containing polymer particles (fixing resin/pigment-containing polymer particles) is preferably not less than 0.1 and more preferably not less than 0.2, and is also preferably not more than 2 and more preferably not more than 1.

The content of the water-soluble organic solvent in the aqueous ink is preferably not less than 10% by mass and more preferably not less than 20% by mass, and is also preferably not more than 50% by mass and more preferably not more than 40% by mass.

The total content of the surfactant(s) in the aqueous ink is preferably not less than 0.1% by mass, more preferably not less than 0.5% by mass, and even more preferably not less than 0.8% by mass, and is also preferably not more than 5% by mass, more preferably not more than 4% by mass, and even more preferably not more than 3% by mass.

The content of water in the aqueous ink is preferably not less than 30% by mass, more preferably not less than 40% by mass, and even more preferably not less than 50% by mass, and is also preferably not more than 90% by mass, more preferably not more than 80% by mass, and even more preferably not more than 70% by mass.

(Properties of Aqueous Ink)

The viscosity of the aqueous ink as measured at 32° C. is preferably not less than 2 mPa·s, more preferably not less than 3 mPa·s, and even more preferably not less than 4 mPa·s, and is also preferably not more than 20 mPa·s, more preferably not more than 15 mPa·s, and even more preferably not more than 12 mPa·s, from the viewpoint of improving fixing properties of the resulting ink.

The pH value of the aqueous ink as measured at 20° C. is preferably not less than 5.5, more preferably not less than 6.0, and even more preferably not less than 6.5 from the viewpoint of improving fixing properties of the resulting ink, and is also preferably not more than 11.0, more preferably not more than 10.5, and even more preferably not more than 10.0 from the viewpoint of improving the resistance of members to the ink and suppressing skin irritation.

The aqueous ink of the present invention may be loaded to a conventionally known ink-jet printing apparatus from which droplets of the ink are ejected onto a printing medium, such as a resin film, etc., to print images, etc., on the printing medium. As the method of ejecting the droplets of the ink, there may be used any of a piezoelectric method, a thermal method and an electrostatic method.

As the resin film, there may be mentioned a transparent synthetic resin film. Examples of the transparent synthetic resin film include a polyester film, a polyvinyl chloride film, a polypropylene film, a polyethylene film, a nylon film, and the like. These films may be in the form of any of a biaxially oriented film, a monoaxially oriented film and a non-oriented film. Among these films, preferred are a polyester film and an oriented polypropylene film, and more preferred are a polyethylene terephthalate (PET) film subjected to corona discharge treatment, a biaxially oriented polypropylene (OPP) film subjected to corona discharge treatment, and the like.

EXAMPLES

In the following Production Examples, Preparation Examples, Examples and Comparative Examples, the "part(s)" and "%" indicate "part(s) by mass" and "% by mass", respectively, unless otherwise specified. Incidentally, various properties, etc., were measured and calculated by the following methods.

(1) Measurement of Number-Average Molecular Weight and Weight-Average Molecular Weight of Polymer The number-average molecular weight and the weight-average molecular weight of the polymer were measured by gel permeation chromatography [GPC apparatus: "HLC-8320GPC" available from Tosoh Corporation; columns: "TSKgel Super AWM-H", "TSKgel Super AW3000", and "TSKgel guardcolumn Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B(F-550, F-80, F-10, F-1, A-1000), PStQuick C(F-288, F-40, F-4, A-5000, A-500] all available from Tosoh Corporation as a reference standard substance.

As a sample to be measured, there was used a dispersion prepared by mixing 0.1 g of the polymer with 10 mL of the aforementioned eluent in a glass vial, stirring the resulting mixture with a magnetic stirrer at 25° C. for 10 hours, and then subjecting the mixture to filtration treatment through a syringe filter "DISMIC-13HP" (made of PTFE; 0.2 µm) available from Advantec Co., Ltd.

(2) Measurement of Average Particle Size of Pigment-Containing Polymer Particles in Water Dispersion The pigment-containing polymer particles in the water dispersion were subjected to cumulant analysis using a laser particle analyzing system "ELS-8000" available from Otsuka Electrics Co., Ltd., to measure an average particle size thereof. In the measurement, there was used a dispersion liquid diluted with water such that a concentration of the particles to be measured in the dispersion liquid was adjusted to $5 \times 10^{-3}$% by weight (in terms of a solid content thereof). The measurement was conducted under the conditions including a temperature of 25° C., an angle between incident light and detector of 900 and a cumulative number of 100 times, and a refractive index of water (1.333) was input to the analyzing system as a refractive index of the dispersing medium. The thus measured cumulant average particle size was defined as an average particle size of the pigment-containing polymer particles.

(3) Measurement of Solid Content of Water Dispersion

Using an infrared moisture meter "FD-230" available from Kett Electric Laboratory 5 g of a sample to be measured was dried at a drying temperature of 150° C. under a measuring mode 96 (monitoring time: 2.5 minutes/variation range: 0.05%), and then the water content (%) of the sample to be measured was measured to calculate a solid content thereof according to the following formula.

Solid Content (%)=100−Water Content (%) of Sample to be Measured (4) Measurement of Acid Value of Polymer In an automatic potentiometric titrator (power burette; "Model No.: APB-610") available from Kyoto Electronics Manufacturing Co., Ltd., the resin was dissolved in a titrant solution prepared by mixing toluene and acetone (2:1), and the resulting solution was subjected to titration with a 0.1N potassium hydroxide/ethanol solution by a potentiometric titration method until reaching an end point of the titration observed as an inflection point on the titration curve. The acid value (mgKOH/g) of the resin was calculated from an amount (titer) of the potassium hydroxide solution used in the titration until reaching the end point.

Production Example 1 (Production of Fixing Resin Emulsion 1)

(1) A reaction container equipped with a stirrer, a reflux condenser, and a dropping tank was charged with 0.96 part of acrylic acid, 4.80 parts of cyclohexyl acrylate, 2.24 parts of isobutyl acrylate, 5.89 parts of methyl ethyl ketone (MEK), and 0.65 part of water, as initially charged components, and while maintaining the inside temperature of the reaction container at 77° C., the contents of the reaction container were stirred for 10 minutes.

Then, a mixture containing the monomers, etc., as shown in Table 1, i.e., 8.64 parts of acrylic acid, 43.2 parts of cyclohexyl acrylate, 20.16 parts of isobutyl acrylate, 53.0 parts of MEK, 5.89 parts of water, and 2.64 parts of 4,4'-azobis(4-cyanovaleric acid) as a polymerization initiator, was successively added to the reaction container over 5 hours. After completing the addition of the monomers, etc., the contents of the reaction container were continuously subjected to polymerization reaction for 1 hour, followed by cooling the contents of the reaction container to room temperature, thereby terminating the polymerization reaction.

(2) Added to 15.8 parts of the above obtained copolymer were 4.2 parts of MEK such that the resulting polymer solution was diluted therewith so as to adjust a solid content thereof to 40% by weight. Next, 1.6 parts of a 5N sodium hydroxide aqueous solution were added to the diluted polymer solution, and the resulting dispersion was fully stirred at 25° C. Thereafter, 70.8 parts of water were added to the dispersion over 1 hour, and after completing the addition of water, MEK was evaporated from the dispersion using an evaporator, thereby obtaining a fixing resin emulsion 1.

Production Examples 2 to 9, 11 and 12 and Comparative Production Examples 1 to 4

The same procedure as in Production Example 1 was repeated except that the composition of the monomers constituting the fixing resin were changed to those shown in Table 1, thereby obtaining fixing resin emulsions 2 to 9, 11, 12, and 21 to 24.

Production Example 10 (Production of Fixing Resin Emulsion 10)

(1) A reaction container equipped with a stirrer, a reflux condenser and a dropping tank was charged with 0.36 part of acrylic acid, 1.80 parts of cyclohexyl acrylate, 0.84 part of isobutyl acrylate, 4.29 parts of an emulsifier "LATEMUL E-118B" (sodium polyoxyethylenealkylethersulfate) available from Kao Corporation, 7.44 parts of a polymerization initiator (potassium peroxodisulfate), and 98.11 parts of water, as initially charged components, and while maintaining the inside temperature of the reaction container at 80° C., the contents of the reaction container were stirred for 30 minutes.

Then, a mixture containing the monomers, etc., as shown in Table 1, i.e., 6.84 parts of acrylic acid, 34.2 parts of cyclohexyl acrylate, 15.96 parts of isobutyl acrylate, 2.63 parts of the aforementioned emulsifier "LATEMUL E-118B", 4.56 parts of the aforementioned polymerization initiator (potassium peroxodisulfate), and 24.89 parts of water, was successively added to the reaction container over 3 hours. After completing the addition of the monomers, etc., the contents of the reaction container were continuously subjected to polymerization reaction for 3 hours, followed by cooling the contents of the reaction container to room temperature, thereby terminating the polymerization reaction.

(2) Added to 10.0 parts of the above obtained emulsion copolymer were 1.35 parts of a 5N sodium hydroxide aqueous solution, and the resulting dispersion was fully stirred at 25° C., thereby obtaining a fixing resin emulsion 10.

TABLE 1

|  |  |  | Production Examples ||||||||
|---|---|---|---|---|---|---|---|---|---|---|
|  |  |  | 1 | 2 | 3 | 4 | 5 | 6 | 7 | 8 |
| No. of fixing resin emulsion |  |  | 1 | 2 | 3 | 4 | 5 | 6 | 7 | 8 |
| Composition of constituting monomers (%) | Monomer A | Acrylic acid | 12 | 12 | 12 |  | 12 | 12 | 12 | 7 |
|  |  | Methacrylic acid |  |  |  | 12 |  |  |  |  |
|  | Monomer B | Cyclohexyl acrylate | 60 | 60 |  | 60 | 60 | 40 | 80 | 60 |
|  |  | Cyclohexyl methacrylate |  |  | 60 |  |  |  |  |  |
|  |  | Cyclopentyl acrylate |  |  |  |  |  |  |  |  |
|  |  | Cycloheptyl acrylate |  |  |  |  |  |  |  |  |
|  | Monomer C | Butyl acrylate Tg: −55° C. |  | 28 |  |  |  |  |  |  |
|  |  | Isobutyl acrylate Tg: −33° C. | 28 |  | 28 | 28 |  | 48 | 8 | 33 |
|  |  | Ethyl acrylate Tg: −23° C. |  |  |  |  | 28 |  |  |  |
|  |  | Hexyl acrylate Tg: −45° C. |  |  |  |  |  |  |  |  |
|  | Others | Benzyl acrylate Tg: 6° C. |  |  |  |  |  |  |  |  |
| Properties of fixing resin |  | Glass transition temperature Tg (° C.) | 7.4 | −1.6 | 34.4 | 13.5 | 11.1 | −3.1 | 18.7 | −11.9 |
|  |  | Acid value (mgKOH/g) | 93.5 | 93.5 | 93.5 | 78.3 | 93.5 | 93.5 | 93.5 | 54.5 |
|  |  | Weight-average molecular weight (by the ten thousands) | 14 | 12 | 10 | 14 | 12 | 15 | 19 | 13 |

|  |  |  | Production Examples |||| Comparative Production Examples ||||
|---|---|---|---|---|---|---|---|---|---|---|
|  |  |  | 9 | 10 | 11 | 12 | 1 | 2 | 3 | 4 |
| No. of fixing resin emulsion |  |  | 9 | 10 | 11 | 12 | 21 | 22 | 23 | 24 |
| Composition of constituting monomers (%) | Monomer A | Acrylic acid | 22 | 12 | 12 | 12 | 12 | 12 | 12 | 5 |
|  |  | Methacrylic acid |  |  |  |  |  |  |  |  |
|  | Monomer B | Cyclohexyl acrylate | 60 | 60 |  |  | 20 |  | 60 | 60 |
|  |  | Cyclohexyl methacrylate |  |  |  |  |  |  |  |  |
|  |  | Cyclopentyl acrylate |  |  | 60 |  |  |  |  |  |
|  |  | Cycloheptyl acrylate |  |  |  | 60 |  |  |  |  |
|  | Monomer C | Butyl acrylate Tg: −55° C. |  |  |  |  |  |  |  |  |
|  |  | Isobutyl acrylate Tg: −33° C. | 18 | 28 | 28 | 28 | 68 | 28 |  | 35 |
|  |  | Ethyl acrylate Tg: −23° C. |  |  |  |  |  |  |  |  |
|  |  | Hexyl acrylate Tg: −45° C. |  |  |  |  |  | 60 |  |  |
|  | Others | Benzyl acrylate Tg: 6° C. |  |  |  |  |  |  | 28 |  |
| Properties of fixing resin |  | Glass transition temperature Tg (° C.) | −3.1 | 7.4 | 14.9 | 3.9 | −12.9 | −30.0 | 20.8 | −13 |
|  |  | Acid value (mgKOH/g) | 171 | 93.5 | 93.5 | 93.5 | 93.5 | 93.5 | 93.5 | 39 |
|  |  | Weight-average molecular weight (by the ten thousands) | 16 | 93 | 23 | 40 | 18 | 11 | 19 | 21 |

Monomer A: (Meth)acrylic acid
Monomer B: Cycloalkyl (meth)acrylate
Monomer C: Alkyl (meth)acrylate whose homopolymer has Tg of not higher than 0 C.

Preparation Example 1 (Preparation of Water Dispersion of Pigment-Containing Polymer Particles 1)

(1) Synthesis of Water-Insoluble Polymer

Sixteen parts of methacrylic acid, 44 parts of styrene, 30 parts of a styrene macromonomer "AS-6S" (tradename; number-average molecular weight: 6,000; solid content: 50%) available from Toagosei Co., Ltd., and 25 parts of methoxypolyethylene glycol methacrylate "BLEMMER PME-200" (tradename) available from NOF Corporation were mixed with each other to prepare 115 parts of a monomer mixture solution.

Eighteen parts of MEK and 0.03 part of a polymerization chain transfer agent (2-mercaptoethanol) as well as 10% (11.5 parts) of the monomer mixture solution prepared above were charged into a reaction container and mixed with each other, and then an inside atmosphere of the reaction container was fully replaced with nitrogen gas.

On the other hand, a mixed solution prepared by mixing remaining 90% (103.5 parts) of the monomer mixture solution, 0.27 part of the aforementioned polymerization chain transfer agent, 42 parts of MEK, and 3 parts of a polymerization initiator "V-65" (tradename; 2,2'-azobis(2,4-dimethylvaleronitrile)) available from FUJIFILM Wako Pure Chemical Corporation, was charged into a dropping funnel. In a nitrogen atmosphere, the mixed solution in the reaction container was heated to 75° C. while stirring, and then the mixed solution in the dropping funnel was added dropwise into the reaction container over 3 hours. After the elapse of 2 hours from completion of the dropwise addition while maintaining the resulting mixed solution at 75° C., a solution prepared by dissolving 3 parts of the aforementioned polymerization initiator in 5 parts of MEK was added to the reaction container, and the resulting reaction solution was further aged at 75° C. for 2 hours and then at 80° C. for 2 hours, followed by further adding 50 parts of MEK thereto, thereby obtaining a solution of a water-insoluble polymer (weight-average molecular weight: 50,000; acid value: 104 mgKOH/g) (solid content of the solution: 45%).

(2) Preparation of Water Dispersion of Pigment-Containing Polymer Particles 1

The water-insoluble polymer solution obtained in the above (1) in an amount of 95.2 parts was dissolved in 53.7 parts of MEK, and then the resulting solution was mixed with 13.7 parts of a 5N sodium hydroxide aqueous solution and 0.5 part of 25% aqueous ammonia both acting as a neutralizing agent as well as 341.8 parts of ion-exchanged water. Furthermore, 100 parts of a cyan pigment "Fastogen Blue CA5380 15:3" (tradename) available from DIC Corporation were added to the resulting mixture to thereby obtain a pigment mixed solution (neutralization degree of polymer: 72 mol %).

The resulting pigment mixed solution was mixed at 20° C. for 1 hour using a disper blade operated at 7000 rpm. The resulting dispersion was further subjected to dispersion treatment under a pressure of 180 MPa using a high-pressure homogenizer "Microfluidizer M-140K" (tradename) available from Microfluidics Corporation by passing the dispersion through the device 15 times.

The thus obtained dispersion liquid of the pigment-containing polymer particles was maintained at 60° C. under reduced pressure to remove MEK therefrom, followed by further removing a part of water therefrom. The resulting dispersion was subjected to centrifugal separation, and a liquid layer portion separated therefrom was subjected to filtration treatment through a membrane filter "Minisart Syringe Filter" (tradename; pore size: 5 µm; material: cellulose acetate) available from Sartorius Inc., to remove coarse particles therefrom, thereby obtaining a water dispersion of the pigment-containing polymer particles (solid content: 22%).

Then, 0.45 part of a crosslinking agent "DENACOL EX 321L" (tradename; trimethylolpropane polyglycidyl ether; epoxy equivalent: 130) available from Nagase ChemteX Corporation (corresponding to a crosslinking rate of 30 mol %) and 15.23 parts of ion-exchanged water were added to 100 parts of the resulting water dispersion of the pigment-containing polymer particles, and the obtained mixture was subjected to heat treatment at 70° C. for 3 hours while stirring (solid content: 22%). After cooling the obtained dispersion to room temperature, a liquid layer portion separated therefrom was subjected to filtration treatment through the membrane filter "Minisart Syringe Filter" (tradename) to remove coarse particles therefrom, thereby obtaining a water dispersion of pigment-containing polymer particles 1 (solid content: 22%; pigment content: 15.2%; polymer content: 6.8%; average particle size: 110 nm).

Preparation Example 2 (Production of Water Dispersion of Pigment-Containing Polymer Particles 2)

(1) Production of Polyester Resin

Polyoxypropylene (2.2)-2,2-bis(4-hydroxyphenyl)propane as an alcohol component and fumaric acid as a carboxylic acid component were reacted with each other at 210° C. for 10 hours in the presence of tin (II) di(2-ethyl hexanoate) as an esterification catalyst and 3,4,5-trihydroxybenzoic acid as an esterification co-catalyst, thereby obtaining a polyester resin having an acid value of 22.4 mg KOH/g and a weight-average molecular weight of 13700 (molar ratio of [carboxylic acid component/alcohol component]: 1.04).

(2) Production of Water Dispersion of Pigment-Containing Polymer Particles 2

In a 2 L-capacity container, 66.7 g of the polyester resin obtained in the above (1) was dissolved in 198.6 g of MEK, and a 5N sodium hydroxide aqueous solution was added to the resulting polymer solution such that 85 mol % of an acid value of the polyester resin was neutralized. Then, 390.5 g of ion-exchanged water was further added dropwise to the polymer solution over 30 minutes, and the resulting reaction solution was stirred and mixed at a temperature of 10 to 15° C. using a disper blade operated at 1,500 r/min for 15 minutes.

Successively, 100 g of C.I. Pigment Blue 15:3 "CFB6338JC" (tradename) available from Dainichiseika Color & Chemicals Mfg. Co., Ltd., was added to the reaction solution, and the resulting mixture was stirred and mixed at a temperature of 10 to 15° C. using a disper blade operated at 6,500 r/min for 2 hours to thereby obtain a preliminary dispersion.

The resulting preliminary dispersion was subjected to filtration treatment through a 200-mesh filter, and then diluted by adding 36.1 g of ion-exchanged water thereto. Thereafter, the thus obtained diluted dispersion was subjected to dispersion treatment under a pressure of 150 MPa using a Microfluidizer "M-110EH-30XP" (tradename; high-pressure homogenizer) available from Microfluidics Corporation by passing the dispersion through the device 15 times, thereby obtaining a water dispersion liquid of pigment-containing polymer particles 2.

A 2 L eggplant-shaped flask was charged with the whole amount of the thus obtained pigment water dispersion liquid, and then ion-exchanged water was added thereto such that a solid content of the dispersion liquid was adjusted to 15%. The resulting dispersion was maintained under a pressure of 0.09 MPa (abs) in a warm water bath adjusted to 32° C. for 3 hours using a rotary distillation apparatus "Rotary Evaporator N-1000S" (tradename) available from Tokyo Rikakikai Co., Ltd., operated at a rotating speed of 50 r/min to remove the organic solvent therefrom. Furthermore, the temperature of the warm water bath was adjusted to 62° C., and the pressure in the apparatus was reduced to 0.07 MPa (abs), and the resulting reaction solution was concentrated under this condition until a solid content of the reaction solution became 25%, thereby obtaining a concentrated product.

The thus obtained concentrated product was charged into a 500 mL angle rotor, and subjected to centrifugal separation using a high-speed cooling centrifuge "himac CR22G" (tradename; temperature set: 20° C.) available from Hitachi Koki Co., Ltd., at 3,660 r/min for 20 minutes. Thereafter, a liquid layer portion separated from the concentrated product was subjected to filtration treatment through the membrane filter "Minisart Syringe Filter" (tradename), and then the resulting solution was diluted with water such that a solid content of the solution became 22%, thereby obtaining a water dispersion of pigment-containing polymer particles 2 (solid content: 22%; pigment content: 13.2%; polymer content: 8.8%; average particle size: 95 nm).

Example 1 (Preparation of Aqueous Ink 1)

The water dispersion of the pigment-containing polymer particles 1 (8.17 parts as solid components), 2.83 parts of the fixing resin emulsion obtained in Production Example 1, 32 parts of propylene glycol, 2 parts of diethylene glycol monoisobutyl ether (iBDG), 1 part of an acetylene glycol-based surfactant "SURFYNOL 440" (tradename; average molar number of addition of EO: 3.5) available from Nissin Chemical Co., Ltd., 0.25 part of a polyether-modified silicone surfactant "KF-6011" (tradename) available from Shin-Etsu Chemical Co., Ltd., 0.2 part of a polyether-modified silicone surfactant "KF-353A" (tradename) available from Shin-Etsu Chemical Co., Ltd., and ion-exchanged water were mixed with each other and fully stirred so as to prepare an ink composition shown in Table 2 (100 parts in total). The resulting ink composition was subjected to filtration treatment through the membrane filter "Minisart Syringe Filter" (tradename), thereby obtaining an aqueous ink 1 (solid content: 11%; pigment content: 5.6%; polymer content: 5.4%).

Examples 2 to 14 and Comparative Examples 1 to 4

The same procedure as in Example 1 was repeated except that the conditions were changed to those shown in Table 2, thereby obtaining aqueous inks 2 to 14 and 21 to 24.

Incidentally, the water dispersion 1, the water dispersion 2 and the self-dispersible pigment shown in Table 2 represent the water dispersion of the pigment-containing polymer particles 1, the water dispersion of the pigment-containing polymer particles 2 and a cyan pigment "CAB-O-JET 450C" (tradename) available from Cabot Corporation, respectively.

The aqueous inks 1 to 14 and 21 to 24 obtained in the aforementioned Examples and Comparative Examples were respectively used to prepare printed materials by the method described in the following item (1). The resulting printed materials were evaluated with respect to peel strength and cellophane tape peeling by the methods described in the following items (2) and (3), respectively. The results are shown in Table 2.

Incidentally, the numerical values shown in Table 2 are amounts of active ingredients (amounts of solid components) contained in the respective inks.

(1) Preparation of Printed Material

The respective aqueous inks were applied onto a corona discharge-treated surface of a PET film "FE2001 #25" (tradename) available from Futamura Chemical Co., Ltd., and a corona discharge-treated surface of an OPP film "FOR-AQ #25" (tradename) available from Futamura Chemical Co., Ltd., using a bench-top coater "TC-1 Model" (tradename) available from Mitsui Electric Co., Ltd., and a bar coater No. 3, and dried at 50° C. for 3 minutes, thereby preparing a printed material.

Meanwhile, the bench-top coater test as a simple evaluation method was conducted as a substitute for an ink-jet printing test. It is considered that with regard to fixing properties of ink, the bench-top coater test has a correlation with the ink-jet printing test.

(2) Measurement of Peel Strength

A double-sided adhesive tape "Nice Tack No. 4" (tradename) available from NICHIBAN Co., Ltd., was adhered to the resulting printed material, and the printed material was subjected to T-peel test using a Tensilon universal material testing instrument "RTC-1150A" (tradename) available from A & D Co., Ltd., to thereby measure a peel strength (N/15 mm) of the ink.

The peel strength is preferably not less than 1.5 N/15 mm, and more preferably not less than 2 N/15 mm.

(3) Measurement of Cellophane Tape Peeling

A cellophane tape "CT-18" (tradename) available from NICHIBAN Co., Ltd., was adhered to the resulting printed material as a sample, and rapidly peeled off from the sample. After peeling off the tape, the sample was visually observed to examine whether or not any peeling occurred, and the cellophane tape peeling of the ink was evaluated according to the following evaluation ratings.

(Evaluation Ratings)
○: No peeling of the ink occurred;
Δ: Partially peeled portion of the ink was recognized; and
x: Whole portion of the ink was peeled off.

If the evaluation rating was ○ or Δ, the ink was practically usable without problems.

Meanwhile, the aforementioned peel strength (2) has no strong correlation with the cellophane tape peeling (3). It is desirable that the peel strength (2) is not less than 1.5 N/15 mm, and the evaluation rating of the cellophane tape peeling is either ○ or Δ.

TABLE 2

|  |  |  | Examples | | | | | | | | |
| --- | --- | --- | --- | --- | --- | --- | --- | --- | --- | --- | --- |
|  |  |  | 1 | 2 | 3 | 4 | 5 | 6 | 7 | 8 | 9 |
| Kind of aqueous ink |  |  | 1 | 2 | 3 | 4 | 5 | 6 | 7 | 8 | 9 |
| Composition of aqueous ink | Pigment | Water dispersion 1 *1 | 8.17 | 8.17 | 8.17 | 8.17 | 8.17 | 8.17 | 8.17 | 8.17 | 8.17 |
|  |  | Water |  |  |  |  |  |  |  |  |  |

TABLE 2-continued

| formulated (%) | | dispersion 2 *1<br>Self-dispersible pigment *1 | | | | | | | | | |
|---|---|---|---|---|---|---|---|---|---|---|---|
| | Fixing resin emulsion | Emulsion 1 | 2.83 | | | | | | | | |
| | | Emulsion 2 | | 2.83 | | | | | | | |
| | | Emulsion 3 | | | 2.83 | | | | | | |
| | | Emulsion 4 | | | | 2.83 | | | | | |
| | | Emulsion 5 | | | | | 2.83 | | | | |
| | | Emulsion 6 | | | | | | 2.83 | | | |
| | | Emulsion 7 | | | | | | | 2.83 | | |
| | | Emulsion 8 | | | | | | | | 2.83 | |
| | | Emulsion 9 | | | | | | | | | 2.83 |
| | | Emulsion 10 | | | | | | | | | |
| | | Emulsion 11 | | | | | | | | | |
| | | Emulsion 12 | | | | | | | | | |
| | | Emulsion 21 | | | | | | | | | |
| | | Emulsion 22 | | | | | | | | | |
| | | Emulsion 23 | | | | | | | | | |
| | | Emulsion 24 | | | | | | | | | |
| | Propylene glycol | | 32 | 32 | 32 | 32 | 32 | 32 | 32 | 32 | 32 |
| | iBDG | | 2 | 2 | 2 | 2 | 2 | 2 | 2 | 2 | 2 |
| | Surfactant | | 1.45 | 1.45 | 1.45 | 1.45 | 1.45 | 1.45 | 1.45 | 1.45 | 1.45 |
| | Ion-exchanged water | | Balance | Balance | Balance | Balance | Balance | Balance | Balance | Balance | Balance |
| Evaluation | Peel strength (N/15 mm) | PET | 3.04 | 2.74 | 1.83 | 1.75 | 2.50 | 2.44 | 1.74 | 1.76 | 2.13 |
| | | OPP | 3.09 | 3.01 | 2.54 | 2.95 | 2.92 | 2.80 | 3.21 | 3.20 | 2.75 |
| | Cellophane tape peeling | OPP | ○ | ○ | ○ | ○ | ○ | Δ | ○ | ○ | ○ |

| | | | Examples | | | | | Comparative Examples | | | |
|---|---|---|---|---|---|---|---|---|---|---|---|
| | | | 10 | 11 | 12 | 13 | 14 | 1 | 2 | 3 | 4 |
| Kind of aqueous ink | | | 10 | 1 | 12 | 13 | 14 | 21 | 22 | 23 | 24 |
| Composition of aqueous ink formulated (%) | Pigment | Water dispersion 1 *1 | 8.17 | 8.17 | 8.17 | | | 8.17 | 8.17 | 8.17 | 8.17 |
| | | Water dispersion 2 *1 | | | | 8.17 | | | | | |
| | | Self-dispersible pigment *1 | | | | | 8.17 | | | | |
| | Fixing resin emulsion | Emulsion 1 | | | | 2.83 | 2.83 | | | | |
| | | Emulsion 2 | | | | | | | | | |
| | | Emulsion 3 | | | | | | | | | |
| | | Emulsion 4 | | | | | | | | | |
| | | Emulsion 5 | | | | | | | | | |
| | | Emulsion 6 | | | | | | | | | |
| | | Emulsion 7 | | | | | | | | | |
| | | Emulsion 8 | | | | | | | | | |
| | | Emulsion 9 | | | | | | | | | |
| | | Emulsion 10 | 2.83 | | | | | | | | |
| | | Emulsion 11 | | 2.83 | | | | | | | |
| | | Emulsion 12 | | | 2.83 | | | | | | |
| | | Emulsion 21 | | | | | | 2.83 | | | |
| | | Emulsion 22 | | | | | | | 2.83 | | |
| | | Emulsion 23 | | | | | | | | 2.83 | |
| | | Emulsion 24 | | | | | | | | | 2.83 |
| | Propylene glycol | | 32 | 32 | 32 | 32 | 32 | 32 | 32 | 32 | 32 |
| | iBDG | | 2 | 2 | 2 | 2 | 2 | 2 | 2 | 2 | 2 |
| | Surfactant | | 1.45 | 1.45 | 1.45 | 1.45 | 1.45 | 1.45 | 1.45 | 1.45 | 1.45 |
| | Ion-exchanged water | | Balance | Balance | Balance | Balance | Balance | Balance | Balance | Balance | Balance |
| Evaluation | Peel strength (N/15 mm) | PET | 2.40 | 2.96 | 2.54 | 1.65 | 2.19 | 2.89 | 1.83 | 2.25 | 0.84 |
| | | OPP | 2.40 | 2.30 | 2.47 | 2.22 | 2.82 | 2.63 | 2.34 | 2.04 | 1.60 |
| | Cellophane tape peeling | OPP | ○ | Δ | ○ | Δ | Δ | x | x | x | x |

Note
*1: Compositional ratio (%) of solid components compounded

From the results shown in Table 2, it was confirmed that the aqueous inks 1 to 14 obtained in the Examples were excellent in fixing properties as compared to the aqueous inks 21 to 24 obtained in the Comparative Examples, and therefore capable of providing a printed material having excellent peel strength.

INDUSTRIAL APPLICABILITY

According to the present invention, it is possible to provide an aqueous ink having excellent fixing properties against a resin film. The aqueous ink for ink-jet printing according to the present invention is useful, in particular, for forming images on a resin film by an ink-jet printing method.

The invention claimed is:
1. An aqueous ink comprising a pigment, a fixing resin, and water, wherein:
the fixing resin comprises a constitutional unit derived from (meth)acrylic acid (A), a constitutional unit derived from a cycloalkyl (meth)acrylate (B), and a constitutional unit derived from an alkyl (meth)acrylate (C) whose homopolymer has a glass transition temperature (Tg) of not higher than 0° C., a content of the constitutional unit derived from the (meth)acrylic acid (A) is not less than 6% by mass and not more than 25% by mass on the basis of the whole constitutional units of the fixing resin, a content of the constitutional unit derived from the cycloalkyl (meth)acrylate (B) is not less than 30% by mass and not more than 90% by mass on the basis of the whole constitutional units of the fixing resin, and a glass transition temperature (Tg) of the fixing resin is not lower than −20° C. and not higher than 40° C., wherein the pigment is in a form of pigment-containing polymer particles, and the pigment-containing polymer particles are in a form of crosslinked polymer particles containing the pigment, the crosslinked polymer particles obtained by crosslinking the pigment-containing polymer particles with a crosslinking agent.

2. The aqueous ink according to claim 1, wherein the cycloalkyl (meth)acrylate (B) is at least one compound selected from the group consisting of cyclopentyl (meth)acrylate, cyclohexyl (meth)acrylate, and cycloheptyl (meth)acrylate.

3. The aqueous ink according to claim 1, wherein the alkyl (meth)acrylate (C) is at least one compound selected from the group consisting of ethyl acrylate, butyl acrylate, isobutyl acrylate, and hexyl acrylate.

4. The aqueous ink according to claim 1, wherein a content of the constitutional unit derived from the alkyl (meth)acrylate (C) is not less than 4% by mass and not more than 60% by mass on the basis of the whole constitutional units of the fixing resin.

5. A method for printing the aqueous ink of claim 1 on a resin film.

6. A method for printing the aqueous ink of claim 1 wherein the printing is ink-jet printing.

7. The aqueous ink according to claim 1, wherein an acid value of the fixing resin is not less than 20 mgKOH/g and not more than 200 mgKOH/g.

8. The aqueous ink according to claim 1, wherein a weight-average molecular weight of the fixing resin is not less than 20,000 and not more than 1,000,000.

9. The aqueous ink according to claim 1, wherein a content of the fixing resin in the aqueous ink is not less than 0.5% by mass and not more than 10% by mass, based on a total mass of the aqueous ink.

10. The aqueous ink according to claim 1, wherein the fixing resin is in the form of resin particles, and the resin particles have a homogeneous structure.

11. The aqueous ink according to claim 1, wherein the fixing resin is in the form of resin particles, and an average particle size of the resin particles is not less than 10 nm and not more than 300 nm.

12. The aqueous ink according to claim 1, wherein a polymer consisting of the pigment-containing polymer particles is a vinyl-based resin.

13. The aqueous ink according to claim 12, wherein the vinyl-based resin comprises a constitutional unit derived from (a-1) an ionic monomer, and further contains a constitutional unit derived from (a-2) a hydrophobic monomer and/or a constitutional unit derived from (a-3) a nonionic monomer.

14. The aqueous ink according to claim 1, wherein a polymer consisting of the pigment-containing polymer particles is a polyester resin.

15. The aqueous ink according to claim 1, wherein a mass ratio of the fixing resin to the pigment-containing polymer particles (fixing resin/pigment-containing polymer particles) is not less than 0.1 and not more than 2.

16. The aqueous ink according to claim 1, further comprising a water-soluble organic solvent.

17. The aqueous ink according to claim 16, wherein the water-soluble organic solvent is at least one solvent selected from the group consisting of a glycol ether and a polyhydric alcohol.

18. The aqueous ink according to claim 1, further comprising a surfactant.

19. The aqueous ink according to claim 1, wherein the crosslinking agent is a polyfunctional epoxy compound containing not less than 2 epoxy groups in a molecule thereof.

* * * * *